(12) United States Patent
Hibbard et al.

(10) Patent No.: US 7,818,474 B2
(45) Date of Patent: Oct. 19, 2010

(54) PROVISIONAL LOAD SHARING BUFFER FOR REDUCING HARD DISK DRIVE (HDD) ACTIVITY AND IMPROVING RELIABILITY AND LIFETIME

(76) Inventors: Gary D. Hibbard, 3770 Old Path Crossing, Suwanee, GA (US) 30024; Dennis L. Jesensky, 397 Brookview Tr., Lawrenceville, GA (US) 30044

( * ) Notice: Subject to any disclaimer, the term of this patent is extended or adjusted under 35 U.S.C. 154(b) by 500 days.

(21) Appl. No.: 11/537,037

(22) Filed: Sep. 29, 2006

(65) Prior Publication Data
US 2008/0147910 A1 Jun. 19, 2008

(51) Int. Cl.
*G06F 3/00* (2006.01)
*G11B 5/596* (2006.01)

(52) U.S. Cl. .................... 710/29; 360/78.04
(58) Field of Classification Search ............ 710/29; 360/78.04
See application file for complete search history.

(56) References Cited

U.S. PATENT DOCUMENTS

| | | | | |
|---|---|---|---|---|
| 5,996,023 | A * | 11/1999 | Winter et al. | 709/253 |
| 6,337,716 | B1 * | 1/2002 | Yim | 348/554 |
| 2001/0053112 | A1 | 12/2001 | Matsui | |
| 2003/0099460 | A1 | 5/2003 | Imada et al. | |
| 2003/0228140 | A1 * | 12/2003 | Bullock et al. | 386/125 |
| 2005/0111819 | A1 * | 5/2005 | Cormack et al. | 386/46 |
| 2005/0193284 | A1 * | 9/2005 | Yasuo | 714/48 |
| 2006/0129713 | A1 | 6/2006 | Xie | |

FOREIGN PATENT DOCUMENTS

EP 1486980 12/2004

(Continued)

OTHER PUBLICATIONS

Marsh B., et al.: "Flash memory file caching for mobile computers" System Sciences, 1994. vol. 1: Architecture, Proceedings of the Twenty-Seventh Hawaii International Conference on Wailea, HI, USA Jan. 4-7, 1994, Los Alamitos, CA, USA, IEEE Comput. Soc, Jan. 4, 1994, pp. 451-460, XP010096924.

(Continued)

*Primary Examiner*—Henry W Tsai
*Assistant Examiner*—Tushar S Shah
(74) *Attorney, Agent, or Firm*—Merchant & Gould (57) ABSTRACT

The present invention is directed towards reducing hard disk drive (HDD) activity by sharing the buffering activity between a provisional load sharing buffer (PLSB) and a time shift buffer (TSB). The HDD may be included in a digital host communications terminal (DHCT). Initially, the PLSB buffers initial streaming programs to accommodate for channel changes. Additionally, the streaming program is buffered in a standard definition quality regardless of the format of a connected television. Once a predetermined time has passed determined by the size of the PLSB without a channel change, the TSB begins buffering the streaming program. The TSB can then switch between buffering a high definition quality to a standard definition quality of a streaming high definition program depending on other factors to further decrease the HDD activity. Additionally, the TSB can be disabled to prevent buffering of the streaming program.

22 Claims, 4 Drawing Sheets

FOREIGN PATENT DOCUMENTS

| | | |
|---|---|---|
| EP | 1551023 | 7/2005 |
| EP | 1622385 | 2/2006 |
| JP | 2008146786 A * | 6/2008 |
| WO | WO 2004/051998 | 6/2004 |
| WO | WO 2004/061843 | 7/2004 |

OTHER PUBLICATIONS

U.S. Appl. No. 11/537,037, filed Sep. 29, 2006, entitled "Provisional Load Sharing Buffer for Reducing Hard Disk Drive (HDD) Activity and Improving Reliability and Lifetime", Inventors: Gary D. Hibbard, et al.

* cited by examiner

PROVISIONAL LOAD SHARING BUFFER FOR REDUCING HARD DISK DRIVE (HDD) ACTIVITY AND IMPROVING RELIABILITY AND LIFETIME

RELATED APPLICATIONS

The present invention is related to Ser. No. 11/536,966 entitled "Systems and Methods to Improve Consumer Product Reliability and Lifetime of a Hard Disk Drive by Reducing its Activity," having common inventors and concurrently filed herewith.

TECHNICAL FIELD

The present invention is generally related to a digital home communications terminal (DHCT) in a communications system and, more particularly, is related to systems and methods for improving product reliability and lifetime of an included hard disk drive (HDD) by load sharing with a provisional buffer.

BACKGROUND OF THE INVENTION

Hard disk drives (HDDs), more than most other electronic components, experience degradation in performance and eventual failure when subjected to temperature extremes that are often found inside digital home communications terminals (DHCTs) or other consumer products. The chance of failure is higher in proportion to the amount of hard drive activity at higher temperatures. Accordingly, once the HDD's platter and read/write heads begin to degrade, the resulting data errors cause the drive to work harder in an attempt to recover the errors, and this excessive activity increases the chance of even more degradation. There is a need, therefore, for systems and methods that decrease the HDD activity at appropriate times in order to increase the lifetime of the HDD.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

The preferred embodiments of the invention now will be described more fully hereinafter with reference to the accompanying drawings, in which preferred embodiments of the invention are shown. The invention may, however, be embodied in many different forms and should not be construed as limited to the embodiments set forth herein; rather, these embodiments are provided so that this disclosure will be thorough and complete, and will fully convey the scope of the invention to those skilled in the art. Furthermore, all "examples" given herein are intended to be non-limiting.

The present invention is directed towards the enablement of reducing HDD activity, thereby improving the reliability and increasing the lifetime of the HDD. In a DHCT, an HDD may be used to store programs for viewing later. Disadvantageously, in the event of an HDD failure, the stored programs are typically lost and unrecoverable. Therefore, the reliability and lifetime of the HDD in a DHCT, which may also be known as a digital video recorder (DVR) DHCT, is important to a consumer who has selected to record and save certain programs.

Figure 1:
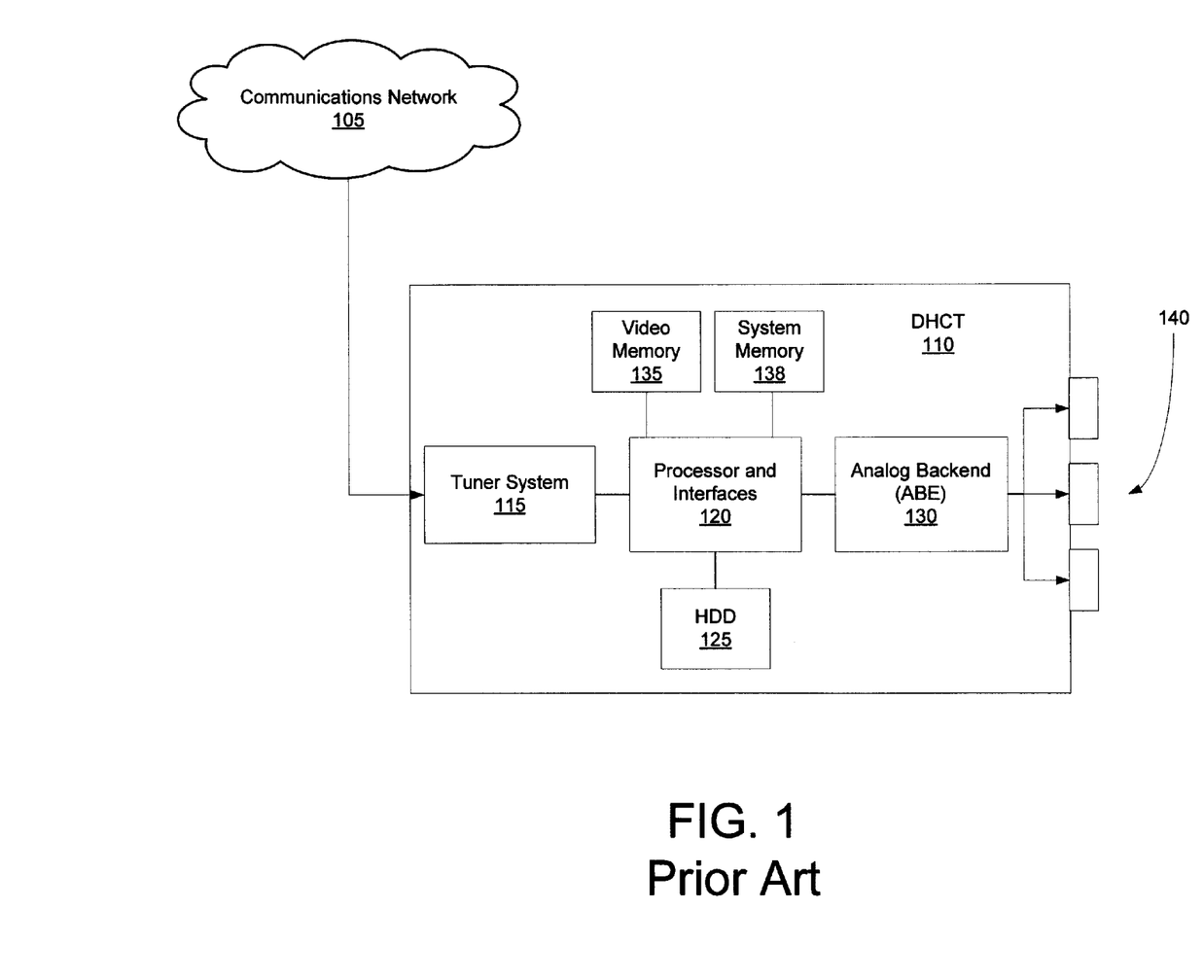
FIG. 1 illustrates a block diagram of a typical DHCT that receives forward signals and transmits reverse signals from a communications network.

FIG. 1 illustrates a block diagram of a typical DHCT 110 that receives forward signals and transmits reverse signals from a communications network. The communications network (CN) 105 provides programs and other data to a plurality of DHCTs, where only one DHCT is shown for illustration purposes, over coaxial cable, optical fiber, wireless, or any other means of transmitting signals. The DHCT 110 includes a tuner system 115 that receives the programs and filters one or more selected programs based on commands from a processor and interfaces 120. The programs streaming on tuned channels may then be provided to a coupled analog backend (ABE) 130 for immediate display, and/or the programs may be stored in an HDD 125 for viewing in the future. Video images of the streaming programs are staged in video memory 135 just prior to being sent to the ABE 130 for display and are typically provided at a rate of 20 to 30 frames per second. The ABE 130 then handles other internal processes, such as receiving video data from the processor 120 and then assembles and sends the data to an appropriate output interface 140.

A DHCT 110 typically includes a plurality of different interfaces 140 for outputting the channel to different viewing devices depending upon its format. Some examples of a video interface include a coaxial radio frequency (RF) output that connects to nearly any television and outputs standard definition (SD) video. The television usually tunes the outputted program on channel 3 or 4. RCA phono connectors with composite NTSC or PAL video and audio outputs are also compatible with most of today's televisions. RCA connectors can carry SD or high definition (HD) analog video in RGB (red, green, blue) format or YPbPr format, which is a variation on RGB. A digitized version of YPbPr could also be carried on the three RCA connectors in a format referred to as YCbCr. The RCA interface is of better quality than the coaxial interface. An S-video interface is a small round mini-DIN connector with a slightly better quality than the RCA interface. High speed interfaces are available in DVI (digital video interface) and HDMI (high definition multimedia interface).

Figure 2:
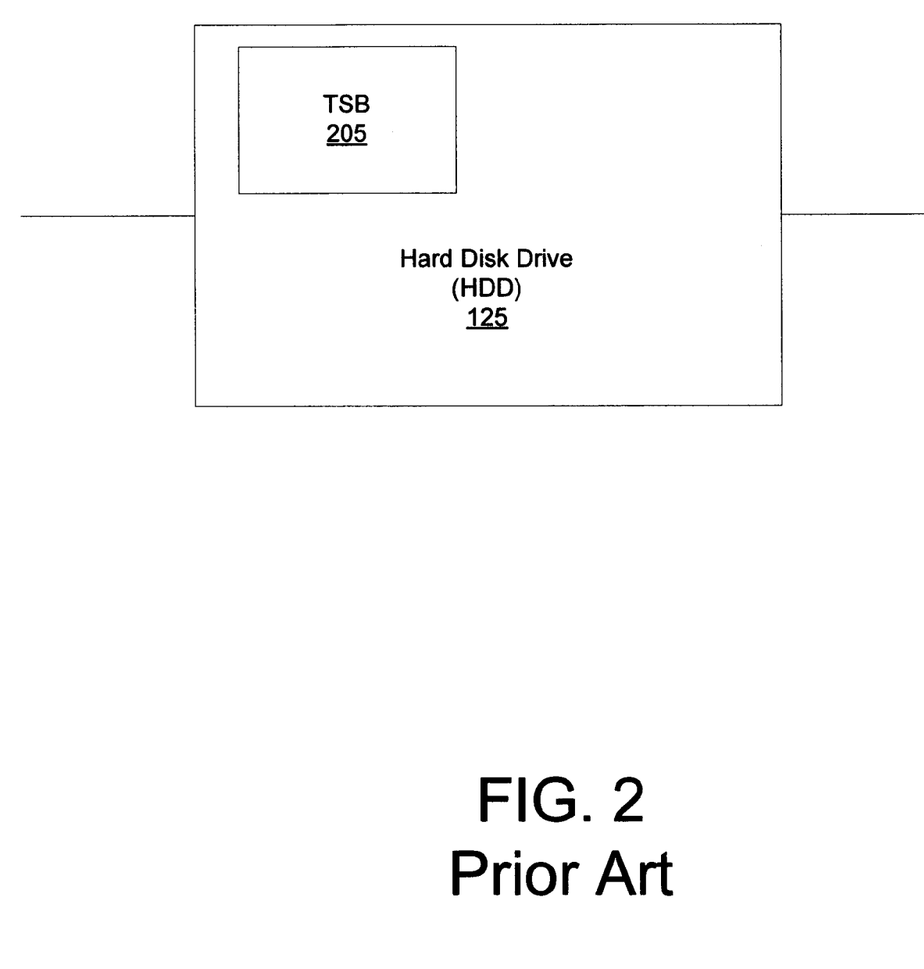
FIG. 2 illustrates an example of the HDD that is suitable for use in the DHCT of FIG. 1.

FIG. 2 illustrates an example of the HDD 125 that is suitable for use in the DHCT 110 of FIG. 1. The HDD 125 is used primarily to store programs for playback at a later time. The HDD 125 also comprises a time shift buffer (TSB) 205 for temporarily storing a copy of the program stream on the currently tuned channel regardless of whether or not the HDD 125 is storing the program for later viewing. The TSB 205 may store approximately one hour of programming, thereby allowing a user to use trick play functions, such as pause, rewind, fast forward, stop, etc, while viewing a live program that is being tuned, or streamed. At the end of the TSB buffering limit, the oldest packets of the buffered program are continuously dropped to allow for further buffering of the program streaming on the tuned channel. If it is desired that the program also be saved, the program will be stored on the HDD 125 along with a copy being stored in the TSB 205 for the trick play functions.

When the tuned channel is changed to another channel, the packets stored in the TSB 205 are subsequently cleared or overwritten to allow for buffering of the new program streaming on the changed channel. If the previous program is being stored on the HDD 125, a first tuner continues to store the program while a second tuner filters the new program streaming on the changed channel to the TSB 205.

Conventionally, the program is buffered in the TSB 205 as received from the tuner system 115; for example, an HD quality program is buffered to the TSB 205 in its original HD format or in a compressed format from which the original HD can be reproduced. Accordingly, an HD format program is typically buffered at a higher rate (i.e., more bytes per second are written to the HDD 125) and with more data than would be buffered using SD quality. Additionally, the program is always buffered in the TSB 205 even when a user is quickly changing channels. Furthermore, the TSB 205 continues buffering the program streaming on the tuned channel when the DHCT 110 remains on even while the television is turned off. Since the TSB 205 is included in the HDD 125 and is always buffering the program on a tuned channel, the HDD 125 is continuously active. Therefore, the higher the operating temperature of the HDD 125 along with the continuous activity, the more likely the HDD 125 will degrade and may prematurely fail. Accordingly, it is an object of the present invention to minimize the HDD activity. In accordance with the present invention, the HDD activity can be minimized by sharing the buffering load of the tuned channel reducing the activity of the internal TSB 205 and thereby reducing the HDD activity.

In a preferred embodiment of the present invention, the tuned, or streaming, channel is buffered in a provisional buffer that is not located within the HDD 125. More specifically, instead of buffering the streaming program in the TSB 205 at all times, a provisional buffer is used to share the load with the TSB 205. Advantageously, when the provisional buffer is buffering the streaming program, the HDD 125 may at that time be inactive. A provisional buffer may be a separate buffer; however, a preferred embodiment utilizes available video memory 135, system memory 138, or HDD cache memory either alone or in combination.

Figure 3:
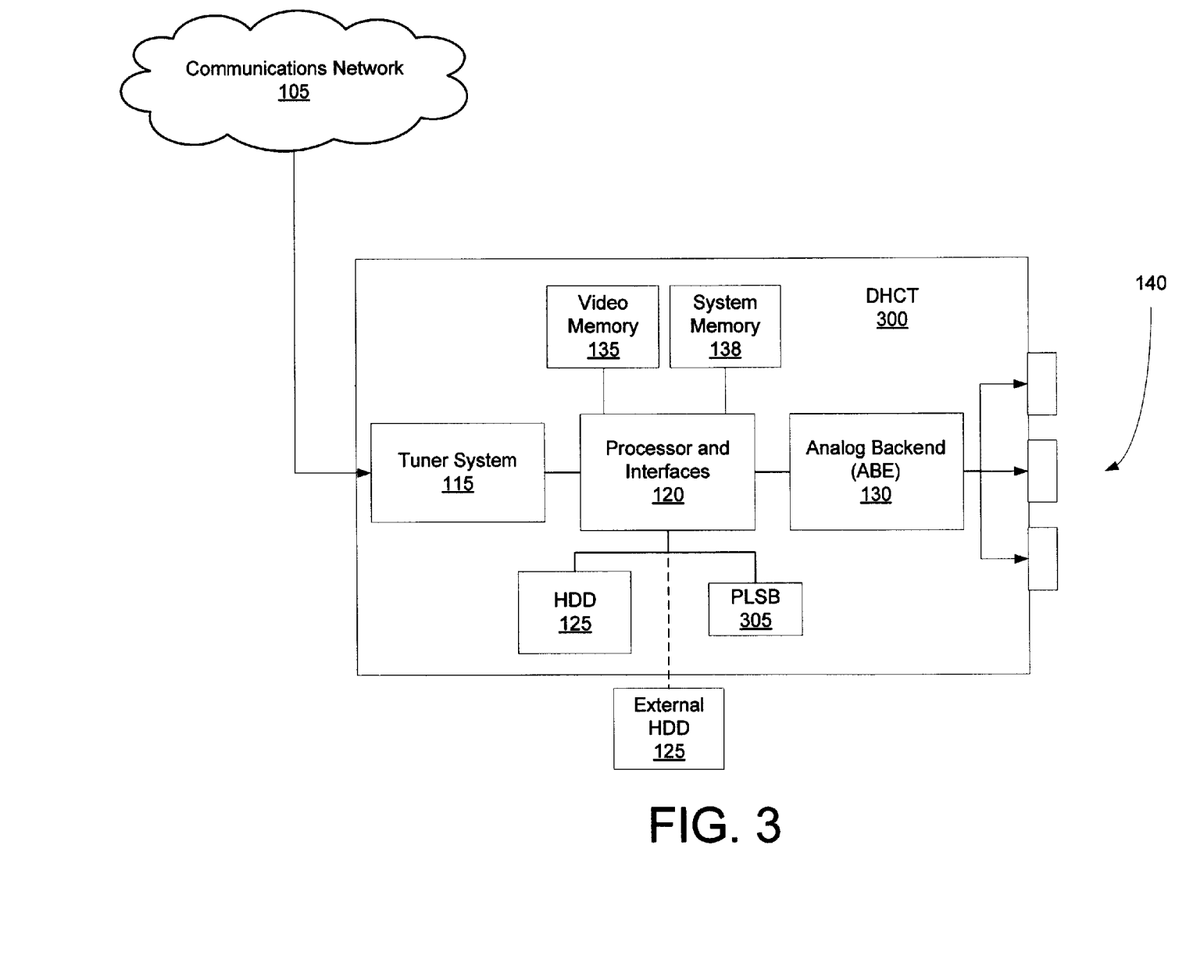
FIG. 3 illustrates a first embodiment of a block diagram of a DHCT that is suitable for use in implementing the present invention.

FIG. 3 illustrates a block diagram of a DHCT 300 that is suitable for use in implementing the present invention. A provisional load sharing buffer (PLSB) 305 is coupled to the processor 120 for receiving the streaming program for a limited duration. In the preferred embodiment, the PLSB 305 is a smaller buffer than the TSB 205 and, as mentioned, may be a combination of the video memory 135, system memory 138, HDD cache memory, or a separate device, such as NAND flash. The size of the PLSB 305 along with the rate at which data is being buffered to it can be determined by the system operator or the manufacturer. By way of example, an operator or user can determine whether the PLSB 305 buffers the rate of the streaming program or a reduced rate of the program (e.g., an HD quality compared to an SD quality). Advantageously, the PLSB 305 sharing the load with the TSB 205 allows the HDD 125, which can be either an internal or an external HDD, to deactivate for a period of time that is proportional to the size of the PLSB 305.

The present invention allows the PLSB 305 to buffer the streaming, or currently tuned, program for a shorter duration to accommodate for channel changes without burdening the TSB 205 and hence the HDD 125. Once the PLSB 305 is full, depending upon its size and the buffering rate, and there has not been a channel change, the processor 120 then transfers the buffered program to the TSB 205. A first method is to continue buffering the streaming program in the empty PLSB 305 at a determined rate until its contents are full again, at which point, the buffered program is again transferred to the TSB 305. In this manner, the HDD 125 is inactive for the short duration depending on whether or not the HDD 125 is recording another program on a channel that is not currently being viewed. For example, the PLSB 305 may buffer approximately 5 minutes of a streaming program at a reduced rate before the stored program is either overwritten with a new streaming program on a different channel or is transferred to the TSB 205. Advantageously, by using the PLSB 305, the user can still rewind or pause the 5 minutes of programming that is either buffered in the PLSB 305 or that was transferred to the TSB 205 along with decreasing the activity of the HDD 125. Another method is to buffer the streaming program in the PLSB 305 at a reduced rate until such time as its contents are full. Once the PLSB 305 is full and the channel has not changed, the buffering responsibility may be transferred to the TSB 305 to continue buffering the program. At this point, the TSB 305 may begin buffering the program with the streaming quality (e.g., an HD quality of an HD program) or continue buffering at the reduced rate.

More specifically, an SD quality of the program may be buffered at all times in the PLSB 305 and also in the TSB 205 when it is appropriate. In this manner, the buffered program does not contain as much data as a buffered HD program, and therefore the HDD 125 does not work as much to store the data. In one embodiment, a reduced video quality is achieved by just buffering the MPEG I-frames and discarding P and B-frames. Another embodiment, may be to re-encode a decimated version of the video sequence (e.g., every other pixel is discarded or adjacent pixels are averaged together) before routing the program to the PLSB 305, the TSB 205, or the HDD 125. It will be appreciated that the viewer of an SD television will not notice the difference during playback of a buffered SD program. Additionally, another option may be to stop buffering the program in the TSB 205, if necessary, to minimize the HDD 125 activity. If the tuned program(s) was selected for recording onto the HDD 125, the processor 120 continues to route the program(s) to the HDD 125 for storage.

Figure 4:
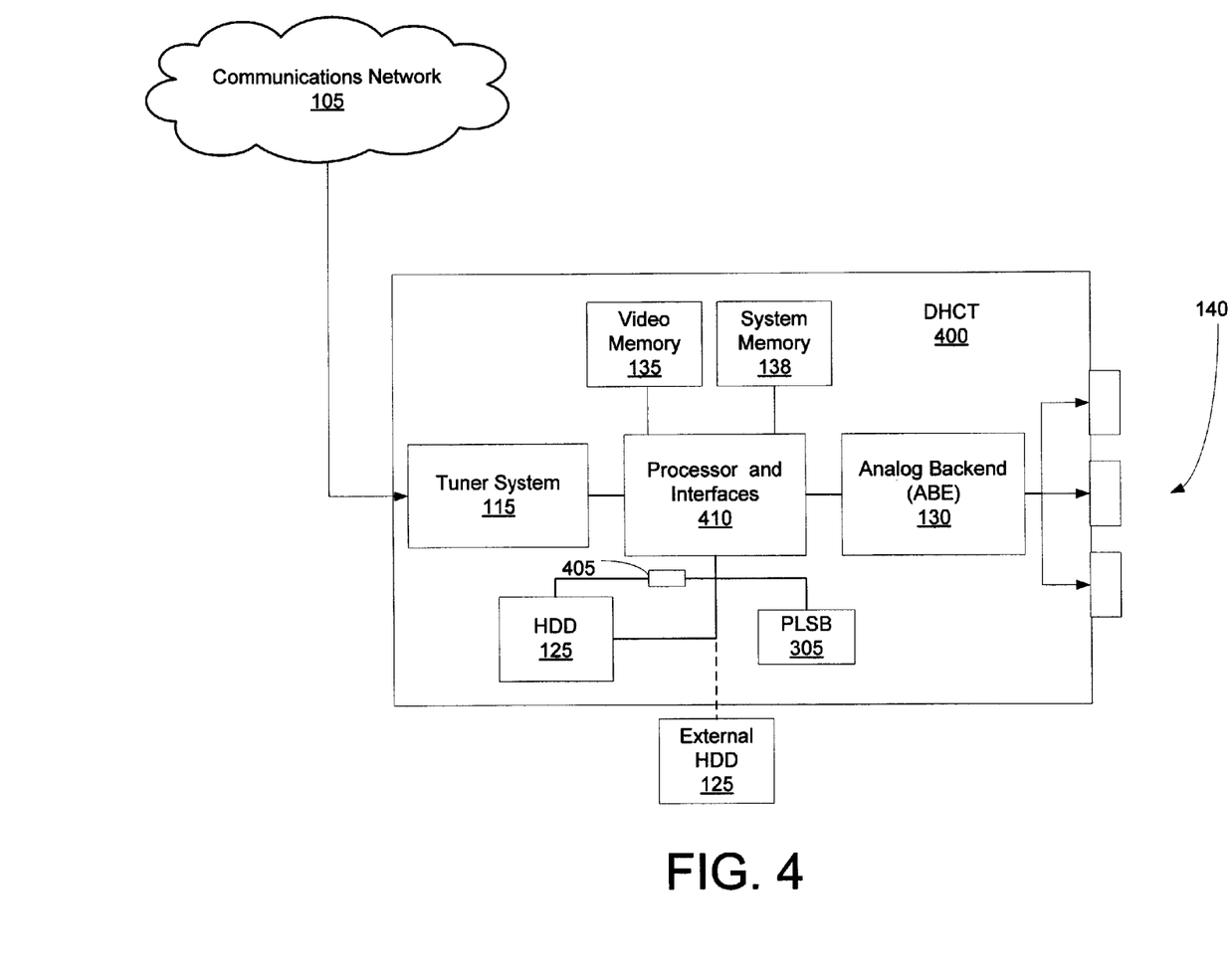
FIG. 4 illustrates a second embodiment of a block diagram of a DHCT that is suitable for using in implementing the present invention.

FIG. 4 illustrates a block diagram of a DHCT 400 that is suitable for use in implementing the present invention. Buffering an SD quality of the program, buffering the streaming program in the PLSB 305, or stop buffering the program altogether can be decided based on several factors. In accordance with the present invention, a first factor may be to monitor the temperature of the HDD 125 with an external or internal temperature device 405. When the temperature rises to a predetermined threshold, a processor 410 may then instruct the TSB 205 to buffer a reduced quality of the program(s) as opposed to an HD quality. Alternatively, the processor 410 may instruct the PLSB 305 to buffer the streaming program until such time as the HDD reduces its internal temperature to an acceptable range.

Another factor may be to monitor the health of the HDD 125. The processor 410 may run periodic tests on the HDD 125 to analyze and report HDD performance. If it reports that the HDD 125 is beginning to show signs of malfunction, the TSB 205 can be instructed to begin buffering a reduced quality of the program or completely stop buffering the program and allow the PLSB 305 to buffer the streaming program until further notice.

Accordingly, systems and methods have been described that increase the lifetime of a HDD 125 by sharing the buffering of a streaming program between the PLSB 305 and the TSB 205. It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and protected by the following claims.

The invention claimed is:

1. A method for load sharing streaming programs in order to reduce hard drive disk activity and extend hard disk drive lifetime and reliability, said method comprising the steps of:
   receiving a first streaming program at a processor coupled to said hard disk drive, wherein said first streaming program is in a high definition format;
   determining whether the first streaming program is to be displayed in a standard definition format;
   in response to determining that the first streaming program is to be displayed in the standard definition format, buffering the said first streaming program at a reduced rate from the high definition format with a first buffer that is external to said hard disk drive and under command from said processor in order to enable said hard disk drive to reside in an inactive state, thereby reducing overall hard disk drive activity; and once said first buffer is full:
   transferring said first buffered data to a second buffer that is internal to said hard disk drive,
   determining whether a channel change to a second streaming program has occurred,
   in response to determining that the channel change to said second streaming program has occurred, buffering said second streaming program with said first buffer, and
   in response to determining that the channel change has not occurred, continuing to perform said buffering of said first streaming program with said second buffer.

2. The method of claim 1, further comprising the steps of:
   receiving a second streaming program at the processor; and
   overwriting the first streaming program with the second streaming program in the first buffer.

3. The method of claim 1, wherein the first buffer is one of a portion of a hard disk drive, a flash memory, an Internal RAM, or an external RAM.

4. A method for load sharing streaming programs in order to reduce hard drive disk activity and extend hard disk drive lifetime and reliability, said method comprising the steps of:
   receiving a first streaming program in a high definition format at a processor coupled to said hard disk drive;
   determining whether the first streaming program is to be displayed in a standard definition format;
   in response to determining that the first streaming program is to be displayed in the standard definition format, buffering said first streaming program at a reduced rate from the high definition format with a first buffer that is external to said hard disk drive and under command from said processor in order to enable said hard disk drive to reside in an inactive state, thereby reducing overall hard disk drive activity; and
   once said first buffer is full:
   transferring said first buffered data to a second buffer that is internal to said hard disk drive, determining whether a channel change has occurred, and
   in response to determining that the channel change has not occurred, continuing to perform said buffering of said the first streaming program with said second buffer.

5. The method of claim 4, further comprising:
   in response to determining that the first streaming program is not to be displayed in the standard definition format, buffering said first streaming program in the standard definition format by said first buffer; and
   buffering said first streaming program in the high definition format by said second buffer.

6. The method of claim 4, wherein said first streaming program is in a high definition format, and wherein said first streaming program is buffered in the standard definition format by said first buffer, and wherein, when certain conditions relating to the condition of said hard disk drive are met said first streaming program is buffered in the standard definition format by said second buffer, wherein said certain conditions relating to the hard disk drive are at least one of:
   said hard disk drive reaching a predetermined temperature threshold; and
   said hard disk drive exhibiting detectable irregularities in storing programs.

7. The method of claim 6, wherein, when the temperature of said hard disk drive reaches a cutoff threshold, the streaming program is buffered only in said first buffer and buffering in said second buffer is discontinued.

8. The method of claim 6, wherein, when a high percentage of said irregularities is detected, the streaming program is buffered only in said first buffer and buffering in said second buffer is discontinued.

9. A recording device for receiving a plurality of programs and reducing activity of a hard disk drive in order to extend hard disk drive lifetime and reliability, comprising:
   a processor coupled to a hard disk drive for:
   receiving a first streaming program in a high definition format, and
   determining whether the first streaming program is to be displayed in a standard definition format;
   a provisional load sharing buffer external to said hard disk drive, and buffer command from said processor for buffering, in response to determining that the first streaming program is to be displayed in the standard definition format, said first streaming program at a reduced rate from the high definition format and for transferring said buffered first streaming program when said provisional load sharing buffer is full, wherein said provisional load sharing buffer begins buffering second streaming program after said transference in response to determining that a channel change has occurred, and enables said hard disk drive to reside in an inactive state, thereby reducing overall hard disk drive activity; and
   a time shift buffer included in said hard disk drive for buffering said first streaming program received from said provisional load sharing buffer, wherein said time shift buffer continues buffering said first streaming program after said transference in response to determining that a channel change has not occurred.

10. The recording device of claim 9, wherein said provisional load sharing buffer is one of a portion of an external hard disk drive and an internal or external memory.

11. A recording device for receiving a plurality of programs and reducing activity of a hard disk drive in order to extend hard disk drive lifetime and reliability, comprising:
   a processor coupled to a hard disk drive for:
   receiving a first streaming program in a high definition format, and
   determining whether the first streaming program is to be displayed in a standard definition format;
   a provisional load sharing buffer external to said hard disk drive, and under command from said processor for buffering, in response to determining that the first streaming program is to be displayed in the standard definition format, said first streaming program at a reduced rate from the high definition format and for transferring said buffered first streaming program when said provisional load sharing buffer is full, wherein said provisional load sharing buffer begins buffering a second streaming program after said transference in response to determining that a channel change has occurred, and wherein said provisional load sharing buffer enables said hard disk drive to reside in an inactive state, thereby reducing overall hard disk drive activity; and a time shift buffer included in said hard disk drive for buffering said first streaming program from said provisional load sharing buffer when said provisional load sharing buffer is full, and continuing to buffer said first streaming program after said transference from said provisional load sharing buffer at a point of the transfer within the first streaming program in response to determining that a channel change has not occurred.

12. The recording device of claim 11, wherein said time shift buffer buffers said first streaming program in the high definition format.

13. The recording device of claim 11, wherein, when certain conditions relating to said hard disk drive are met, said time shift buffer buffers said first streaming program in the standard definition format, wherein said certain conditions relating to said hard disk drive are at least one of:

said hard disk drive reaching a predetermined temperature threshold; and said hard disk drive exhibiting detectable irregularities in storing programs.

14. The recording device of claim 13, further comprising:

a thermometer for sensing a temperature of said hard disk drive, wherein when the temperature of said hard disk drive reaches a first predetermined threshold, said time shift buffer buffers said first streaming program in the standard definition format;

wherein the processor detects any irregularities in storing programs exhibited by said hard disk drive, wherein when the detected irregularities reach a predetermined percentage, said time shift buffer buffers said first streaming program in the standard definition format.

15. The recording device of claim 14, wherein when the temperature of said hard disk drive reaches a second predetermined threshold, said time shift buffer discontinues buffering any streaming programs.

16. A digital home communications terminal for receiving a plurality of programs from a communications system and for selecting one or more programs for further processing, said digital home communications terminal reducing activity of a hard disk drive in order to extend hard disk drive lifetime and reliability and comprising:

a processor coupled to a hard disk drive for:

receiving a first streaming program in a high definition format, and determining whether the first streaming program is to be displayed in a standard definition format;

a provisional load sharing buffer external to said hard disk drive, and under command from said processor for buffering, in response to determining that the first streaming program is to be displayed in the standard definition format, and for transferring said buffered first streaming program when said provisional load sharing buffer is full, wherein said provisional load sharing buffer begins buffering a second streaming program after said transference in response to determining that a channel change has occurred, and enables said hard disk drive to reside in an inactive state, thereby reducing overall hard disk drive activity; and a time shift buffer included in said hard disk drive for buffering said first streaming program received from said provisional load sharing buffer, wherein said time shift buffer continues buffering said first streaming program after said transference in response to determining that a channel change has not occurred.

17. The digital home communications terminal of claim 16, wherein when said second streaming program is received by said processor, said provisional load sharing buffer buffers said second streaming program and, when said provisional load sharing buffer is full, said buffered second program is transferred to said time shift buffer, wherein said buffered first program is overwritten with said transferred second program.

18. A digital home communications terminal for receiving a plurality of programs from a communications system and for selecting one or more programs for further processing said digital home communications terminal reducing activity of a hard disk drive in order to extend hard disk drive lifetime and reliability and comprising:

a processor coupled to a hard disk drive for:

receiving a first streaming program in a high definition format, and determining whether the first streaming program is to be displayed in a standard definition format;

a provisional load sharing buffer external to said hard disk drive, and under command from said processor for buffering, in response to determining that the first streaming program is to be displayed in the standard definition format, the first streaming program in the standard definition format and for transferring said buffered first streaming program when said provisional load sharing buffer is full, wherein said provisional load sharing buffer begins buffering a second streaming program after said transference in response to determining that a channel change has occurred, and wherein said provisional load sharing buffer enables said hard disk drive to reside in an inactive state, thereby reducing overall hard disk drive activity; and a time shift buffer included in said hard disk drive for buffering said first streaming program from said provisional load sharing buffer when said provisional load sharing buffer is full, and continuing to buffer said first streaming program after said transference from said provisional load sharing buffer at a point of the transfer within the first streaming program in response to determining that a channel change has not occurred.

19. The digital home communications terminal of claim 18, wherein said time shift buffer buffers said first streaming program in the high definition format.

20. The digital home communications terminal of claim 18, wherein, when certain conditions relating to the hard disk drive are met, said time shift buffer buffers said first streaming program in the standard definition format, wherein said certain conditions relating to the hard disk drive are at least one of:

said hard disk drive reaching a predetermined temperature threshold; and said hard disk drive exhibiting detectable irregularities in storing programs.

21. The digital home communications terminal of claim 20, further comprising:

a thermometer for sensing a temperature of said hard disk drive, wherein when the temperature of said hard disk drive reaches a first predetermined threshold, and wherein, when the temperature of said hard disk drive reaches a second predetermined threshold, said time shift buffer discontinues buffering the said first streaming program.

22. The digital home communications terminal of claim 20, wherein when said processor detects a predetermined percentage of irregularities in storing programs exhibited by said hard disk drive, said time shift buffer discontinues buffering said first streaming program.

* * * * *